United States Patent Office 2,977,212
Patented Mar. 28, 1961

2,977,212

HERBICIDAL COMPOSITIONS AND METHODS

Nathaniel Tischler, Middlesex County, N.J., assignor to Heyden Newport Chemical Corporation, New York, N.Y., a corporation of Delaware No Drawing. Filed June 2, 1958, Ser. No. 738,946

8 Claims. (Cl. 71—2.6)

The present invention relates to new herbicidal compositions and methods of regulating plant growth including destroying or inhibiting plant growth for which the herbicidal compositions are used.

This application is a continuation-in-part of my copending application Serial No. 473,045, filed December 3, 1954, now abandoned.

Herbicides of the hormonal type are available for inhibiting plant growth; however, the efficient herbicides are relatively few in number and there is a need for new herbicides which meet the requirements for practical use. While a large number of chemical compounds have been considered as herbicides only a few of these compounds are effective and only a small portion of these compounds have been found to be sufficiently effective to be seriously considered for commercial use. A great difficulty in discovering a new herbicide resides in the complete unpredictability of a compound as a herbicide. While attempts have been made to predict the herbicidal effectiveness of a compound based on the known effectiveness of a related compound, it has been found that such predictions are not reliable and are merely guesses. The mechanism by which compounds exert hormonal and herbicidal activity is not fully understood by plant physiologists. It is impossible to determine a compound's herbicidal activity based on the known activity of its hormologues or isomers. It is necessary to test a candidate with a variety of plants at various dosages. For example, isomers of 2,4-dichlorophenoxyacetic acid, a well known herbicide, are ineffective or have an entirely different pattern of effectiveness.

I have discovered that 2,3,6-trichlorophenylacetic acid is an outstanding herbicide for preventing or inhibiting the growth of plants. The present herbicide may be used as the acid or in other herbicidal forms such as the salts, amides or esters of this acid. These other forms may be considered as compounds which are reaction products of 2,3,6-trichlorophenylacetic acid with other compounds although these other herbicidal forms may be produced in any desired manner. The salt of 2,3,6-trichlorophenylacetic acid may be water soluble or water insoluble. Representative salts are the metal salts including the alkali metal salts such as the sodium or potassium salts and the alkaline earth salts such as the calcium salt, the ammonium salt, and the amine salts such as the salts of primary, secondary and tertiary alkyl amines and the mono-, di- and trialkanolamines including ethanolamine, diethanolamine and triethanolamine. The herbicide also may be in the form of esters of this acid and aliphatic monohydric alcohols, for example, the alkyl esters of 2,3,6-trichlorophenylacetic acid as well as the esters of this acid and monohydric ether alcohols such as ethylene glycol monomethyl ether, ethylene glycol monoethyl ester, ethylene glycol monobutyl ether, diethylene glycol monoethyl ether, diethylene glycol monobutyl ether and triethylene glycol monobutyl ether. The amides of 2,3,6-trichlorophenylacetic acid may be used. For the sake of brevity, this list of compounds will not be repeated throughout this application, it being understood that the appropriate remarks are applicable to all of these 2,3,6-trichlorophenylacetic acid compounds as well as the particular compound mentioned.

The 2,3,6-trichlorophenylacetic acid as well as its compounds may be applied to existing plants or to the soil or other medium normally supporting plant growth or both. The herbicide may be applied to soil containing a crop, desirable plants, to inhibit the growth of weeds, undesirable plants, or may be applied to parking areas, roadsides and the like, either alone or mixed with other herbicides, to keep the area free of plants. While the acid or other compounds may be applied as such, the compounds are preferably diluted with a carrier and may be distributed over the area in which plant growth is to be controlled in the form of solutions or emulsions or in the form of a solid finely divided carrier mixed with or having deposited thereon the herbicide. A water insoluble form such as 2,3,6-trichlorophenylacetic acid may be dissolved in a solvent and this solution used as the herbicidal composition or may be dissolved in a water-immiscible solvent, for example, fuel oil or kerosene, and this solution dispersed in water to form an emulsion. In the latter case an emulsifying agent is preferably employed.

The concentration of 2,3,6-trichlorophenylacetic acid in the herbicidal composition may vary widely and depends on a number of factors, one of the most important being the amount of composition applied per unit of area being treated and the type of plants being treated. The herbicidal compositions will contain an amount of herbicide toxic to the plant or plants to be treated when the composition is applied in the quantity intended. The herbicidal compositions may contain other herbicides.

The 2,3,6-trichlorophenylacetic acid may be produced in any desirable manner and may, for example, be produced from 2,3,6-trichlorotoluene in the manner hereinafter described. This isomer may be used alone or in the presence of other isomers of trichlorophenylacetic acid. In the present instance, the acid was prepared from mixed isomers of trichlorotoluene so that the acid was a mixture of isomers of trichlorophenylacetic acid. However, the pure 2,3,6-isomer could be used. The various salts, esters and amides may be formed from the acid in the same manner as used for homologues or analogues of this acid.

The dosages referred to herein are the dosages per acre and the amounts set forth are expressed as acid. When the acid form is used or under consideration the amount referred to is the actual amount by weight of 2,3,6-trichlorophenylacetic acid applied per unit of area. Where a compound other than the acid is used or under consideration, the amount set forth in the dosage is that weight of 2,3,6-trichlorophenylacetic acid equivalent to the weight of this other compound actually applied or under consideration. Thus, when a compound other than the acid is used, the amount of the compound actually applied may be calculated from the equivalent amount of 2,3,6-trichlorophenylacetic acid set forth under the dosage by using the formula:

$$\frac{\text{Mol. wt. of 2,3,6-trichlorophenylacetic acid}}{\text{Mol. wt. of compound actually applied}}$$

$\times$ amount of compound actually applied $=$ equivalent amount of 2,3,6-trichlorophenylacetic acid The amount of herbicidal composition used is the amount necessary to provide the equivalent amount of 2,3,6-trichlorophenylacetic acid set forth under dosage.

EXAMPLE I

This example illustrates the preparation of trichlorophenylacetic acid by reacting trichlorobenzyl chloride with sodium cyanide to form trichlorobenzonitrile and then hydrolyzing this nitrile with sulphuric acid to form trichlorophenylacetic acid. The trichlorobenzyl chloride can be readily formed by the monochlorination of trichlorotoluene. In this example the trichlorobenzyl chloride as well as the trichlorophenylacetic acid product, contained about 70% of the corresponding 2,3,6-isomer. The trichlorophenylacetic acid was used in this mixed isomer form without separation of the 2,3,6-trichlorophenylacetic acid. The sodium salt referred to in the following examples was prepared by reacting the trichlorophenylacetic acid with sodium hydroxide and the sodium salt contained about 70% by weight of the 2,3,6-isomer.

The effectiveness is indicated in the following examples by the numerals 0 through 5 to indicate increasing effectiveness. For example, when describing the effect of the herbicide on density, the numeral "5" indicates all or substantially all plants were destroyed or their growth prevented.

EXAMPLE II

In this example the present herbicide was spray tested on young bean plants prior to development of trifoliate shoots. The herbicide was applied in the form of an aqueous solution of the sodium salts of the mixed isomers prepared as described in Example 1. The concentration of the solution was varied so that application of the same volume of solution in each of the tests resulted in the application of the amounts of the sodium salt of 2,3,6-trichlorophenylacetic acid required to produce the dosages expressed as the equivalent amount of 2,3,6-trichlorophenylacetic acid. The amounts of sodium salt actually applied were larger than the amounts set forth under dosages as the molecular weight of the sodium salt is greater than the acid.

*Table I*

| Test No. | Dosage, oz./acre | Stem Epinasty | Leaf Epinasty | Leaf Curl | Leaf Burn |
|---|---|---|---|---|---|
| A | 0.0875 | 0 | 1 | 1 | 0 |
| B | 0.35 | 1 | 2 | 2 | 0 |
| C | 0.91 | 2 | 3 | 2 | 0 |
| D | 4.48 | 3 | 4 | 3 | 1 |
| E | 22.4 | 5 | 5 | 4 | 2 |

EXAMPLE III

A series of plantings were made of each of two broad-leaved (dicotyledonous) plants, rape and flax, and also of two grassy (monocotyledonous) plants, timothy and golden millet. After planting and prior to emergence of these plants, the soil in part of the plantings of each series was sprayed with an aqueous solution of the sodium salt of 2,3,6-trichlorophenylacetic acid. The amount of solution used was such as to apply the amounts of the sodium salt equivalent to the amount of 2,3,6-trichlorophenylacetic acid set forth under "Dosage." A portion of each series was not treated for comparative purposes. Also, for comparative purposes the soil in other plantings of each series was sprayed with the indicated dosages of isopropyl-N-meta-chlorophenyl carbamate. The series of plantings were observed 7–8 days after planting and the results are set forth in Tables II and III. In these tables "D" represents the density, "S" represents the effect on size and "I" represents injury. All values were determined by comparison with the blanks or non-sprayed plantings.

*Table II*

| Herbicide | Dosage, lb./acre | Rape | | | Flax | | |
|---|---|---|---|---|---|---|---|
| | | D | S | I | D | S | I |
| Isopropyl N-Metachlorophenyl carbamate | 2 | 0 | 0 | 0 | 4 | 4 | 2 |
| | 16 | 0 | 0 | 0 | 4 | 4 | 2 |
| 2,3,6-trichlorophenylacetic acid | 1.4 | 4 | 4 | 4 | 5 | --- | --- |
| | 11.2 | 5 | 4 | 4 | 5 | --- | --- |

*Table III*

| Herbicide | Dosage, lb./acre | Rape | | | Flax | | |
|---|---|---|---|---|---|---|---|
| | | D | S | I | D | S | I |
| Isopropyl N-metachlorophenyl carbamate | 2 | 1 | 4 | 3 | 5 | --- | --- |
| | 16 | 0 | 4 | 3 | 5 | --- | --- |
| 2,3,6-trichlorophenylacetic acid | 1.4 | 2 | 4 | 3 | 0 | 3 | 4 |
| | 11.2 | 3 | 4 | 4 | 3 | 4 | 4 |

The 2,3,6-trichlorophenylacetic acid gave good control of all species but was more effective against the dicotyledonous plants than the monocotyledonous.

EXAMPLE IV

In this series of pre-emergence tests a number of flats each containing about 4 inches of soil were separately planted with various seeds. Each series of flats was sprayed substantially immediately after planting with varying amounts of the sodium salt of 2,3,6-trichlorophenylacetic acid. Similarly planted flats were not sprayed to provide a comparison. The results at 6–7 days after planting and spraying are set forth in Table IV. The effect on density is noted under "D," the effect on size under "S" and injury under "I."

*Table IV*

| Dosage, Lb./acre | Rape | | | Flax | | | Lamb's-Quarters | | | Millet | | | Timothy | | |
|---|---|---|---|---|---|---|---|---|---|---|---|---|---|---|---|
| | D | S | I | D | S | I | D | S | I | D | S | I | D | S | I |
| 0.175 | 0 | 1 | 0 | 2 | 0 | 1 | 1 | 1 | 1 | 0 | 0 | 0 | 0 | 1 | 1 |
| 0.35 | 1 | 2 | 1 | 4 | 2 | 1 | 4 | 4 | 3 | 0 | 1 | 1 | 0 | 1 | 2 |
| 0.7 | 3 | 3 | 4 | 5 | --- | --- | 5 | --- | --- | 0 | 2 | 4 | 0 | 2 | 4 |
| 1.4 | 4 | 3 | 3 | 5 | --- | --- | 5 | --- | --- | 3 | 2 | 4 | 1 | 2 | 3 |

EXAMPLE V

In this series of post emergence tests established plants in flats were sprayed with aqueous solutions of the sodium salt of 2,3,6-trichlorophenylacetic acid containing varying amounts of the sodium salt so that the dosages were equivalent to 0.35 and 0.7 lb./acre of 2,3,6-trichlorophenylacetic acid. The effect on the plants is set forth in Table V.

*Table V*

| Dosage, lb./acre | Rape | | | Flax | | | Lamb's-Quarters | | | Golden Millet | | | Timothy | | |
|---|---|---|---|---|---|---|---|---|---|---|---|---|---|---|---|
| | D | S | I | D | S | I | D | S | I | D | S | I | D | S | I |
| 0.35 | 2 | 1 | 2 | 2 | 2 | 3 | 2 | 1 | 2 | 0 | 0 | 1 | 0 | 0 | 1 |
| 0.7 | 2 | 1 | 3 | 2 | 2 | 3 | 2 | 1 | 3 | 0 | 0 | 1 | 0 | 0 | 2 |

2,3,6-trichlorophenylacetic acid is effective both pre and post-emergently, however, it is more effective per unit of weight when used pre-emergently.

EXAMPLE VI

The present herbicide is very effective against a large variety of plants, particularly dicotyledonous plants, and compares favorably in effectiveness with the well known herbicide, 2,4-dichlorophenoxyacetic acid, commonly referred to as "2,4-D." In these comparative tests, each of a series of flats containing soil was planted with seeds and sprayed at the time of planting with herbicide. Only one variety of seed was planted in a flat and only one herbicide was applied to a flat. Planted but untreated flats were used as controls. One herbicide was a mixture of isomers of trichlorophenylacetic acid containing 70% of the 2,3,6-isomer. The other herbicide was 2,4-D and each herbicide was applied as an aqueous solution of the sodium salt. The amount of herbicide applied as the sodium salt was that amount equivalent to the dosage amount of trichlorophenylacetic acid or 2,4-dichlorophenoxyacetic acid. For example, when the dosage was one pound per acre, the amount of sodium salt was equivalent to one pound per acre of trichlorophenylacetic acid containing the equivalent of 0.7 pound per acre of the 2,3,6-isomer or one pound per acre of 2,4-D. Observations were made ten days after planting and spraying. The results based on comparison with nonsprayed flats are set forth in Table VI, wherein "D"=density, "S"=size and "I"=injury. The numerals 0 through 5 indicate increasing effectiveness so that D-5 indicates substantially no plants developed. In this table "2,4-D" indicates 2,4-dichlorophenoxyacetic acid used as its sodium salt and "Trichloro-" indicates trichlorophenylacetic acid containing 70% of the 2,3,6-isomer and used as sodium trichlorophenyl acetate.

Table VI

| Dosage, lb./A | 2,4-D | | | Trichloro | | | Species |
|---|---|---|---|---|---|---|---|
| | D | S | I | D | S | I | |
| 0.25 | 0 | 1 | 1 | 0 | 1 | 1 | Rape. |
| 0.5 | 1 | 3 | 1 | 0 | 1 | 1 | |
| 1.0 | 3 | 3 | 1 | 2 | 3 | 2 | |
| 2.0 | 4 | 4 | 4 | 3 | 3 | 2 | |
| 0.25 | 0 | 0 | 1 | 0 | 1 | 1 | Lamb's-quarters. |
| 0.5 | 0 | 1 | 1 | 2 | 3 | 2 | |
| 1.0 | 0 | 2 | 1 | 3 | 4 | 3 | |
| 2.0 | 2 | 2 | 2 | 4 | 4 | 4 | |
| 0.25 | 0 | 1 | 1 | 1 | 1 | 2 | Alfalfa. |
| 0.5 | 1 | 3 | 2 | 1 | 2 | 2 | |
| 1.0 | 2 | 4 | 4 | 2 | 3 | 3 | |
| 2.0 | 3 | 4 | 4 | 2 | 4 | 4 | |
| 0.25 | 0 | 0 | 1 | 0 | 0 | 1 | Vetch. |
| 0.5 | 1 | 2 | 2 | 0 | 1 | 2 | |
| 1.0 | 2 | 2 | 3 | 1 | 2 | 2 | |
| 2.0 | 3 | 3 | 3 | 3 | 3 | 3 | |
| 0.25 | 0 | 0 | 0 | 0 | 0 | 0 | Field Corn. |
| 0.5 | 0 | 1 | 0 | 0 | 1 | 0 | |
| 1.0 | 0 | 1 | 0 | 0 | 1 | 1 | |
| 2.0 | 0 | 2 | 2 | 0 | 2 | 1 | |
| 0.25 | 0 | 0 | 0 | 0 | 0 | 0 | Wheat. |
| 0.5 | 0 | 0 | 0 | 0 | 0 | 0 | |
| 1.0 | 0 | 1 | 0 | 0 | 1 | 0 | |
| 2.0 | 0 | 1 | 1 | 0 | 1 | 1 | |
| 0.25 | 0 | 1 | 1 | 0 | 1 | 1 | Golden Millet. |
| 0.5 | 2 | 2 | 1 | 1 | 1 | 1 | |
| 1.0 | 3 | 2 | 1 | 1 | 3 | 2 | |
| 2.0 | 4 | 3 | 2 | 3 | 3 | 2 | |
| 0.25 | 0 | 1 | 0 | 0 | 1 | 1 | Timothy. |
| 0.5 | 1 | 2 | 1 | 0 | 3 | 1 | |
| 1.0 | 2 | 2 | 1 | 1 | 3 | 2 | |
| 2.0 | 3 | 3 | 3 | 2 | 3 | 3 | |

EXAMPLE VII

The 2,3,6-isomer of trichlorophenylacetic acid is not only a highly effective herbicide but is many times as effective as the 2,4,5-isomer. Flats containing soil were separately planted with rape, alsike clover and timothy seeds and sprayed with a herbicide at the time of planting. Two herbicides were used, one being trichlorophenylacetic acid containing about 70% of the 2,3,6-isomer and the other being substantially pure 2,4,5-trichlorophenylacetic acid. Both herbicides were applied as dilute aqueous solutions of their sodium salts and the amounts of the salts applied per unit of area were equivalent to the amount of trichlorophenylacetic acid set forth under dosage. Observations were made nineteen days after planting and spraying with unsprayed flats being used for control purposes. The results are set forth in Table VII and in this table "2,3,6-trichloro" refers to the trichlorophenylacetic acid containing about 70% of the 2,3,6-isomer and "2,4,5-trichloro" refers to the substantially pure 2,4,5-trichlorophenylacetic acid. As previously used, D=density, S=size and I=injury with the numerals 0 to 5 indicating increasing effect of the herbicide.

Table VII

| Dosage lb./A | Essex Rape | | | | | |
|---|---|---|---|---|---|---|
| | 2,3,6-Trichloro | | | 2,4,5-Trichloro | | |
| | D | S | I | D | S | I |
| 1 | 1 | 1 | 2 | 0 | 0 | 0 |
| 2 | 1 | 2 | 2 | 0 | 1 | 1 |
| 4 | 2 | 3 | 4 | 0 | 1 | 1 |
| 8 | 2 | 4 | 4 | 1 | 2 | 2 |
| | Alsike Clover | | | | | |
| 1 | 0 | 4 | 2 | 0 | 1 | 0 |
| 2 | 2 | 4 | 2 | 0 | 1 | 1 |
| 4 | 3 | 4 | 4 | 0 | 2 | 1 |
| 8 | 4 | 4 | 4 | 2 | 3 | 2 |
| | Timothy | | | | | |
| 1 | 4 | 3 | 3 | 1 | 0 | 0 |
| 2 | 4 | 4 | 4 | 1 | 0 | 0 |
| 4 | 4 | 4 | 4 | 1 | 1 | 1 |
| 8 | 5 | — | — | 2 | 2 | 2 |

The results in Table VII clearly show that the herbicide containing 2,3,6-trichlorophenylacetic acid is many times as effective as the 2,4,5-trichlorophenylacetic acid. For example, one pound per acre of "2,3,6-trichloro" is more effective than 8 pounds per acre of "2,4,5-trichloro" for timothy and is about as effective as 8 pounds per acre of "2,4,5-trichloro" for rape. In alsike clover the dosages of 1 and 2 pounds per acre of "2,3,6-trichloro" were about as effective as 4 and 8 pounds per acre of "2,4,5-trichloro." There is a tremendous and unpredictable difference in activity between these two compounds.

The present herbicide is more effective against dicotyledonous plants than monocotyledonous plants and may be applied in an area of a monocotyledonous crop, for example, corn grass or wheat, to inhibit the growth of broad leaf weeds in the crop area, by inhibiting the growth of established weeds and/or inhibiting the future growth of weeds from seeds in the area. The herbicide may be applied to the area either before or after emergence of the crop. For example, where corn is to be grown in soil in an area, the 2,3,6-trichlorophenylacetic acid, or its equivalent, may be applied to the area either before or after emergence of the corn and before or after emergence of all or part of the weeds which would normally grow in the area. If weeds have emerged, then the herbicide preferably is applied both to the emerged weeds to destroy them and to the soil for reducing subsequent weed growth. If no weeds have substantially emerged, which usually is the case prior to emergence of the corn, then the herbicide is applied to the soil to reduce subsequent weed growth without materially reducing the subsequent growth of the corn.

The effectiveness of 2,3,6-trichlorophenylacetic is so pronounced as to make it a practical herbicide for controlling many plants. The selectivity of this compound is such that it may be used particularly at the lower dosages for controlling weeds in crops.

I claim:
1. A chemical compound selected from the group consisting of 2,3,6-trichlorophenylacetic acid and the salts of said acid.
2. A salt of 2,3,6-trichlorophenylacetic acid.
3. 2,3,6-trichlorophenylacetic acid.
4. A method for controlling the growth of vegetation which comprises applying to the media to be treated a composition comprising as an active ingredient a herbicide selected from the group consisting of 2,3,6-trichlorophenylacetic acid and the salts of said acid.
5. A method for controlling the growth of vegetation which comprises applying to the media to be treated a composition comprising as an active ingredient a salt of 2,3,6-trichlorophenylacetic acid.
6. A method for controlling the growth of vegetation which comprises applying to the media to be treated a composition comprising as an active ingredient 2,3,6-trichlorophenylacetic acid.
7. In the culture of corn in soil in an area normally supporting weed growth, the method of protecting the corn in such area against weed growth comprising applying to the area an amount of herbicide toxic to such weed growth, the herbicide being selected from the group consisting of 2,3,6-trichlorophenylacetic acid and the salts of said acid.
8. In the culture of corn in soil in an area normally supporting weed growth, the method of protecting the corn in such area against subsequent weed growth comprising applying to the area prior to emergence of the corn an amount of herbicide toxic to such weed growth, the herbicide being selected from the group consisting of 2,3,6-trichlorophenylacetic acid and the salts of said acid.

References Cited in the file of this patent

UNITED STATES PATENTS

| | | |
|---|---|---|
| 2,394,916 | Jones | Feb. 12, 1948 |
| 2,444,905 | Sexton | July 13, 1948 |
| 2,726,947 | Baumgartner | Dec. 13, 1955 |

OTHER REFERENCES

Zimmerman et al. in "Contribution from Boyce Thompson Institute, January–March 1951, pages 209–213 incl.